(12) United States Patent
Sato et al.

(10) Patent No.: US 8,738,210 B2
(45) Date of Patent: May 27, 2014

(54) BATTERY TEMPERATURE CONTROL DEVICE

(71) Applicant: Hitachi Automotive Systems, Ltd., Hitachinaka (JP)

(72) Inventors: Shinya Sato, Hitachinaka (JP); Takao Kojima, Hitachinaka (JP); Hitoshi Kobayashi, Machida (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/658,885

(22) Filed: Oct. 24, 2012

(65) Prior Publication Data

US 2013/0103240 A1    Apr. 25, 2013

(30) Foreign Application Priority Data

Oct. 25, 2011   (JP) .................................. 2011-233839

(51) Int. Cl.
*G06F 17/00* (2006.01)
(52) U.S. Cl.
USPC ............................................................ 701/22
(58) Field of Classification Search
USPC ............................................................ 701/22
See application file for complete search history.

(56) References Cited

U.S. PATENT DOCUMENTS

| | | | | |
|---|---|---|---|---|
| 5,795,664 | A * | 8/1998 | Kelly ................................ | 429/7 |
| 6,160,383 | A * | 12/2000 | Carkner ........................ | 320/150 |
| 7,550,949 | B2 * | 6/2009 | Woo et al. ..................... | 320/150 |
| 8,338,011 | B2 * | 12/2012 | Tezuka et al. .................. | 429/62 |
| 8,433,455 | B2 * | 4/2013 | Siy et al. ......................... | 701/1 |
| 2006/0214640 | A1 * | 9/2006 | Woo et al. ..................... | 320/150 |
| 2007/0024244 | A1 * | 2/2007 | Zhu et al. ...................... | 320/150 |
| 2009/0075160 | A1 * | 3/2009 | Tezuka et al. ................... | 429/62 |
| 2010/0212338 | A1 * | 8/2010 | Hermann et al. .............. | 62/118 |
| 2012/0025762 | A1 * | 2/2012 | Lienkamp et al. ............ | 320/109 |
| 2012/0109408 | A1 * | 5/2012 | Siy et al. .......................... | 701/1 |

FOREIGN PATENT DOCUMENTS

| | | |
|---|---|---|
| JP | 10-252467 A | 9/1998 |
| JP | 2006-74852 A | 3/2006 |
| JP | 2009-110829 A | 5/2009 |

OTHER PUBLICATIONS

Japanese Office Action with partial English translation dated Jan. 21, 2014 (Four (4) pages).

* cited by examiner

*Primary Examiner* — Mary Cheung
*Assistant Examiner* — Anne Mazzara
(74) *Attorney, Agent, or Firm* — Crowell & Moring LLP

(57) ABSTRACT

A battery temperature control device for an electric vehicle is provided which is capable of maintaining both the range of the electric vehicle and the battery life at a high level without drastically reducing either of them. A recommended temperature range suitable for battery use and a usable temperature range in which a battery is usable and which is wider than the recommended temperature range are included, and while the battery temperature is basically controlled to converge to the recommended temperature range to maintain the battery life, in a situation where the power consumption necessary for controlling the battery temperature to converge to the recommended temperature is increased, making it difficult to travel a desired travelling distance, the recommended temperature range is switched to the usable temperature range and the battery temperature is controlled to converge to the usable temperature range, and the power consumption necessary for controlling the battery temperature is suppressed and the range of the vehicle is maintained.

6 Claims, 13 Drawing Sheets

BATTERY TEMPERATURE CONTROL DEVICE

BACKGROUND OF THE INVENTION

1. Field of the Invention

The present invention relates to a battery temperature control device, and more particularly, to a battery temperature control device for a lithium ion battery used in an electric vehicle.

2. Background Art

In recent years, electric cars are gaining attention as environment-friendly vehicles. As batteries used in the electric cars, lithium ion batteries with high energy density and high charge acceptability are becoming the mainstream.

Now, the lithium ion battery is highly dependent on temperature with respect to the charge/discharge performance and the life property, and to improve the battery performance such as the charge/discharge performance and the life property, the battery temperature has to be maintained within an appropriate temperature range.

JP Patent Publication (Kokai) No. 10-252467 A (1998) and JP Patent Publication (Kokai) No. 2009-110829 A disclose conventional devices for adjusting the battery temperature mentioned above.

A battery temperature adjusting device disclosed in JP Patent Publication (Kokai) No. 10-252467 A (1998) is a device for adjusting the battery temperature by introducing air inside a vehicle cabin into a battery case and cooling or warming a battery inside the battery case by the air.

Also, a battery temperature adjusting device disclosed in JP Patent Publication (Kokai) No. 2009-110829 A is a device for adjusting the battery temperature by introducing air inside a vehicle cabin into a battery, and at the same time, warming or cooling the air to be introduced into the battery by using a Peltier device in the case that the battery temperature is not within a predetermined temperature range.

SUMMARY OF THE INVENTION

Incidentally, as the temperature range in which a battery may be used, a plurality of temperature ranges are generally known from the standpoint of the battery performance and the life property. Specifically, as shown in FIG. 10, for example, there are a recommended temperature range suitable for using a battery, a usable temperature range where a battery may be used, although the battery performance (for example, charge/discharge capacity) or the life property is slightly reduced, and the like. In the case that the battery performance is the top priority, it is desirable that the battery temperature is controlled to converge to the recommended temperature range by using a heater, a coolant or the like. However, in the case that the ambient temperature is extremely low or extremely high, the energy (the power) necessary to control the battery temperature is very high, and there is an issue that the range of the electric vehicle is drastically reduced.

FIGS. 11A to 11C show the relationship between the battery temperature and the amount of power supply for battery temperature control at the time of battery temperature control by a conventional battery temperature control device in different ambient temperatures, and FIGS. 11A to 11C respectively show the relationship between the battery temperature and the amount of power supply for battery temperature control where the ambient temperatures are 10° C., −10° C. and −20° C.

The amount of power supply to a battery necessary for controlling the battery temperature (corresponding to the power consumption of the battery) is known to be dependent on the difference between a target battery temperature used for battery temperature control and the ambient temperature.

That is, when setting a substantially median value of the recommended temperature range (for example, 20° C.) as the target battery temperature in different environments as shown in FIGS. 11A to 11C, the amount of heat emitted to the outside from a battery increases as the ambient temperature decreases from near the ordinary temperature (10° C.), and the amount of power used by a heater or the like to maintain the battery temperature at the target battery temperature (20° C.) is thereby increased. As a result, the battery power that is consumed increases as the ambient temperature falls, relatively decreasing the power for driving the motor of the electric vehicle, and the range of the electric vehicle is thereby drastically reduced.

On the other hand, in the case that the temperature range used for controlling the battery temperature is extended to the usable temperature range, the energy (the power) necessary for controlling the battery temperature may be suppressed, but the battery temperature will be controlled also in a temperature range outside the recommended temperature range described above, and there is a problem that the battery is easily deteriorated.

According to the battery temperature adjusting devices disclosed in JP Patent Publication (Kokai) No. 10-252467 A (1998) and JP Patent Publication (Kokai) No. 2009-110829 A, heat energy use efficiency for controlling the battery temperature can be improved by introducing the air inside the vehicle cabin into the battery.

However, with the battery temperature adjusting devices disclosed in JP Patent Publication (Kokai) No. 10-252467 A (1998) and JP Patent Publication (Kokai) No. 2009-110829 A, since the battery temperature is to be adjusted to be within a prescribed temperature range at all times regardless of the ambient temperature, the remaining battery power, or the like, there is a problem that it is difficult to maintain a reasonable balance between the range of a vehicle and battery deterioration as described above.

The present invention has been made from the standpoint of the above-described problems, and its aim is to provide a battery temperature control device capable of maintaining both the range of a vehicle and a battery life at a high level.

In order to solve the problems described above, a battery temperature control device according to the present invention is a battery temperature control device for controlling a battery temperature such that the battery temperature converges to a predetermined temperature range, where the battery temperature control device includes a recommended temperature range suitable for battery use, and a usable temperature range in which a battery is usable, the usable temperature range being wider than the recommended temperature range, and where the battery temperature control device sets the predetermined temperature range to the recommended temperature range or the usable temperature range according to at least one of an outside environment, a state of a vehicle and an intention of a driver.

According to the battery temperature control device of the present invention, with the battery temperature control for an electric vehicle including, for example, a lithium ion battery, while the battery can be prevented from deteriorating by basically setting the target battery temperature used for controlling the battery temperature at near the center of the recommended temperature range, in the case that the energy (the power) necessary for controlling the battery temperature is assumed to greatly affect the range of the vehicle, the energy (the power) necessary for controlling the battery temperature is kept at minimum, the power consumption of the battery is suppressed, and the range of the vehicle can thereby be maintained.

Problems, structures and effects other than those described above will be made clear by the following description of embodiments.

DETAILED DESCRIPTION OF THE PREFERRED EMBODIMENTS

Hereinafter, embodiments of a battery temperature control device according to the present invention will be described with reference to the drawings.

[First Embodiment]

Figure 1:
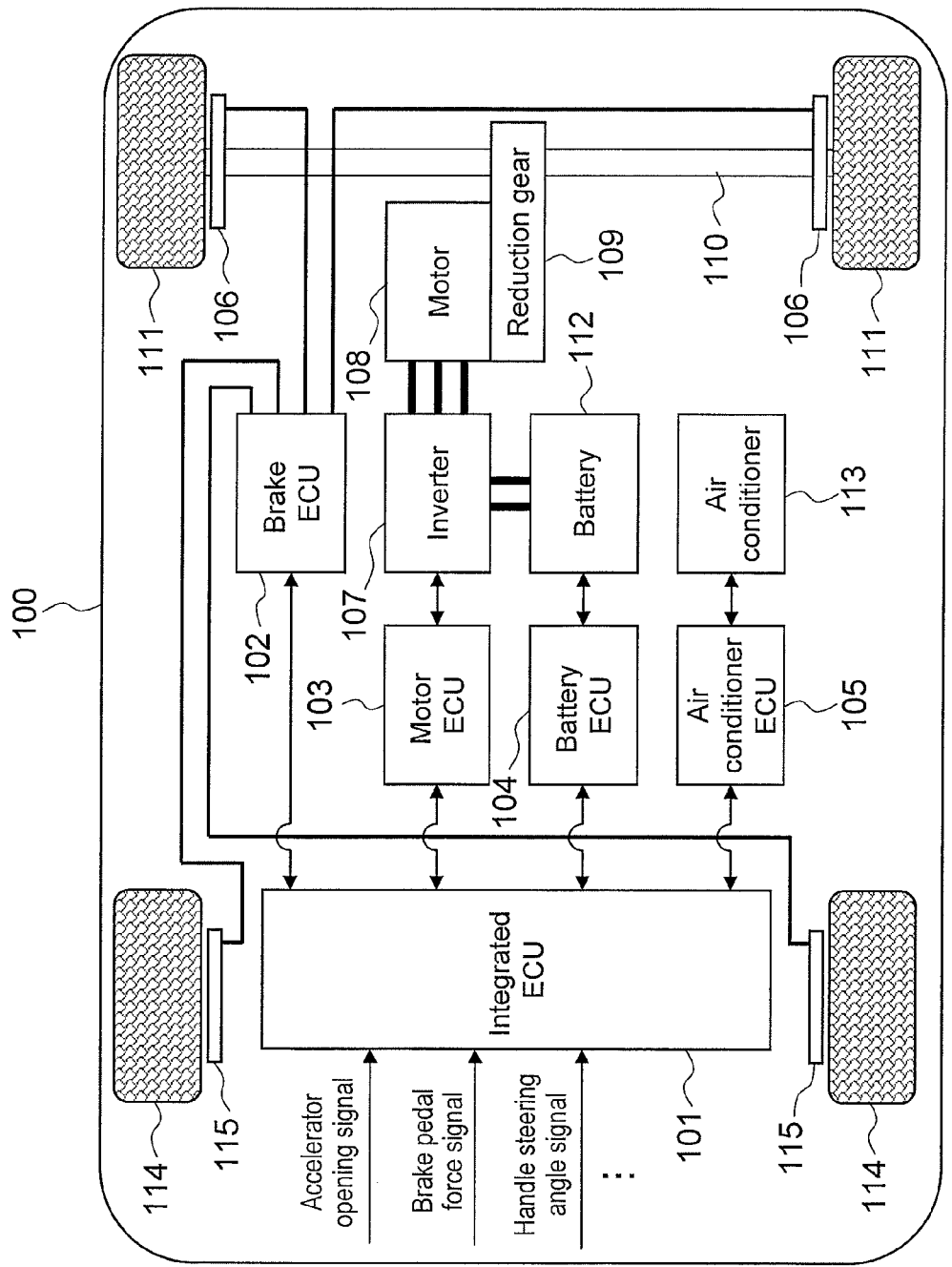
FIG. 1 is an overall configuration diagram schematically showing a system configuration of an electric vehicle to which a first embodiment of a battery temperature control device according to the present invention is applied.

FIG. 1 schematically shows the system configuration of an electric vehicle 100 to which a first embodiment of the battery temperature control device according to the present invention is applied.

The electric vehicle 100 includes a battery (a lithium ion battery) 112, an inverter 107 for performing power conversion on the battery 112, and a motor 108 that is driven by the power of the inverter 107, and motor driving force generated by the driving of the motor 108 is transmitted to drive wheels (front wheels) 111 via a reduction gear 109 and an axle (a drive shaft) 110, enabling a desired travelling state to be achieved. Also, brake discs 106 and 115 are provided respectively to the front wheels 111 and rear wheels 114 of the electric vehicle 100, and the turning of the front wheels 111 and the rear wheels 114 can be controlled according to an operation or the like of a user. The electric vehicle 100 further includes an air conditioner 113, and is capable of realizing suitable temperature inside the vehicle according to the outside environment (for example, the ambient temperature or the like), the state of the vehicle (for example, the temperature inside the vehicle, the remaining battery power, or the like), or the intention of the driver.

Furthermore, the brake discs 106 and 115, the inverter 107, the battery 112, and the air conditioner 113 described above are respectively connected to an brake ECU 102, a motor ECU 103, a battery ECU 104, and an air conditioner ECU 105, and these ECUs (lower ECUs) are connected to an integrated ECU 101, which is their upper ECU.

Accordingly, the integrated ECU 101 to which signals such as an accelerator opening signal, a brake pedal force signal, a handle steering angle signal, and the like, are input calculates a brake braking instruction value, a motor driving instruction value and the like based on these signals, and transmits these instruction values respectively to the brake ECU 102 and the motor ECU 103. Then, the brake ECU 102 controls hydraulic brake pressures of the brake discs 106 and 115 according to the brake braking instruction value, and controls the turning of the front wheels 111 and the rear wheels 114 with a desired brake braking force. Also, the motor ECU 103 transmits the value of necessary power for motor supply to the inverter 107 based on the motor driving instruction value transmitted from the integrated ECU 101, and controls the driving of the motor 108. Here, the power for driving the motor 108 is supplied from the battery 112 based on an instruction transmitted from the battery ECU 104 to the battery 112. Thus, the integrated ECU 101 transmits the motor driving instruction value and the like also to the battery ECU 104, and the battery ECU 104 controls the power to be supplied to the inverter 107 based on this motor driving instruction value.

Additionally, the brake ECU 102 and the motor ECU 103 output necessary information about the brake discs 106 and 115 and the inverter 107 to the integrated ECU 101, and also, the battery ECU 104 performs management of charging/discharging of the battery 112, abnormality diagnosis and the like and outputs necessary battery information to the integrated ECU 101. Furthermore, the integrated ECU 101 transmits, to the air conditioner ECUC 105, an appropriate in-vehicle temperature adjustment instruction value that is in accordance with the outside environment, the state of the vehicle, and the intention of the driver, and the air conditioner ECU 105 controls the air conditioner 113 based on the in-vehicle temperature adjustment instruction value, and also, outputs necessary information about the air conditioner 113 to the integrated ECU 101.

Figure 2:
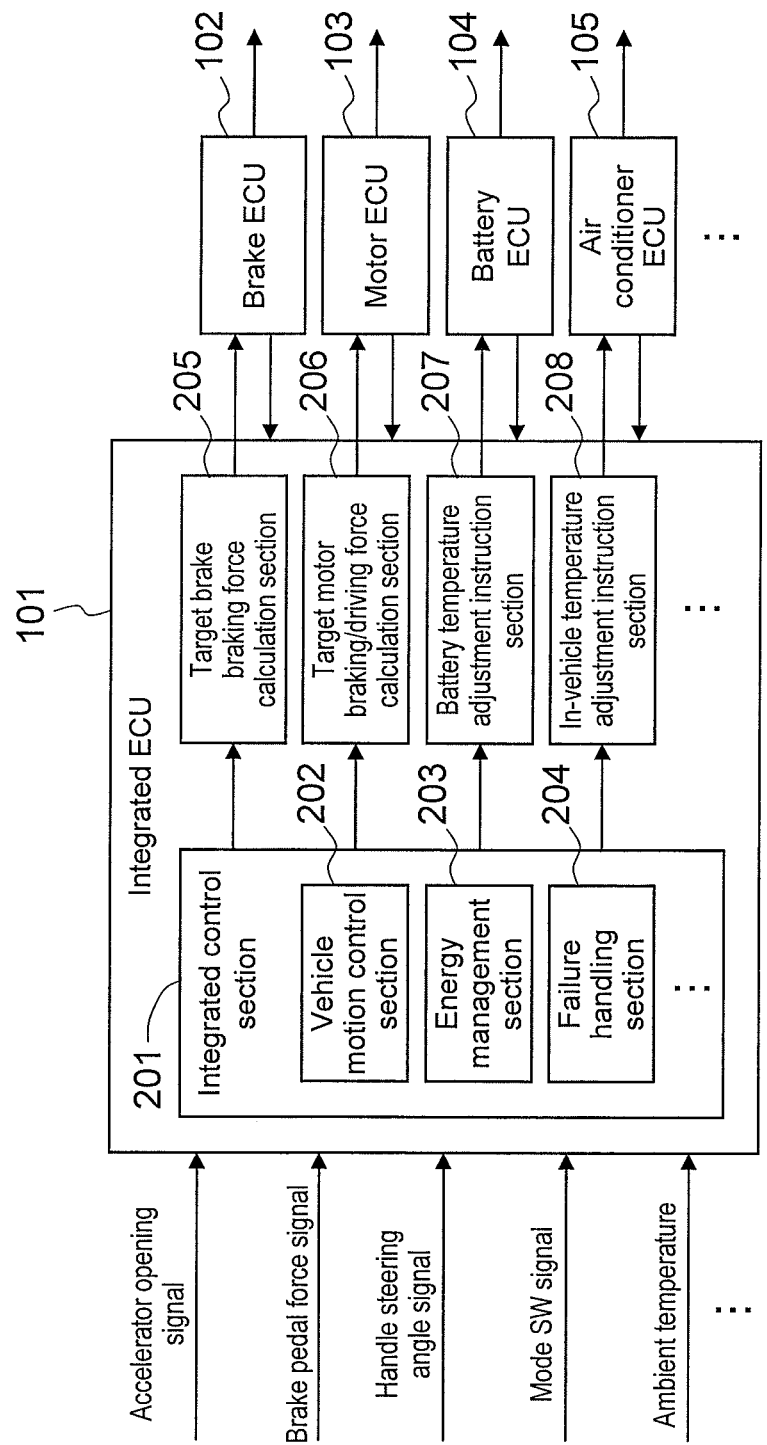
FIG. 2 is a configuration diagram showing the internal configuration of an integrated ECU shown in FIG. 1.

FIG. 2 shows in detail the internal configuration of the integrated ECU shown in FIG. 1.

The integrated ECU 101 is configured at least from an integrated control section 201, a target brake braking force calculation section 205, a target motor braking/driving force calculation section 206, a battery temperature adjustment instruction section 207, and an in-vehicle temperature adjustment instruction section 208. Moreover, the integrated control section 201 is referred to as an upper control module, and the target brake braking force calculation section 205, the target motor braking/driving force calculation section 206, the battery temperature adjustment instruction section 207, and the in-vehicle temperature adjustment instruction section 208 are referred to as lower control modules. Also, the integrated control section 201 includes control modules such as a vehicle motion control section 202, an energy management section 203, a failure handling section 204, and the like.

The integrated control section 201 transmits calculation instructions to the lower control modules, and the lower control modules (the target brake braking force calculation section 205, the target motor braking/driving force calculation section 206, the battery temperature adjustment instruction section 207, and the in-vehicle temperature adjustment instruction section 208) which have received the calculation instructions transmit calculated instruction values to their respective lower ECUs (the brake ECU 102, the motor ECU 103, the battery ECU 104, and the air conditioner ECU 105).

More specifically, the integrated control section 201 comprehensively judges the calculation results of the control modules, such as the vehicle motion control section 202, the energy management section 203, the failure handling section 204 and the like, based on signals such as the accelerator opening signal, the brake pedal force signal, the handle steering angle signal, a mode SW signal, the ambient temperature, and the like, and transmits calculation instructions to the lower control modules, such as the target brake braking force calculation section 205, the target motor braking/driving force calculation section 206, the battery temperature adjustment instruction section 207, the in-vehicle temperature adjustment instruction section 208 and the like. Then, the lower control modules which have received the calculation instructions transmit calculated instruction values respectively to the brake ECU 102, the motor ECU 103, the battery ECU 104, and the air conditioner ECU 105, based on the calculation instructions of the integrated control section 201.

Figure 3:
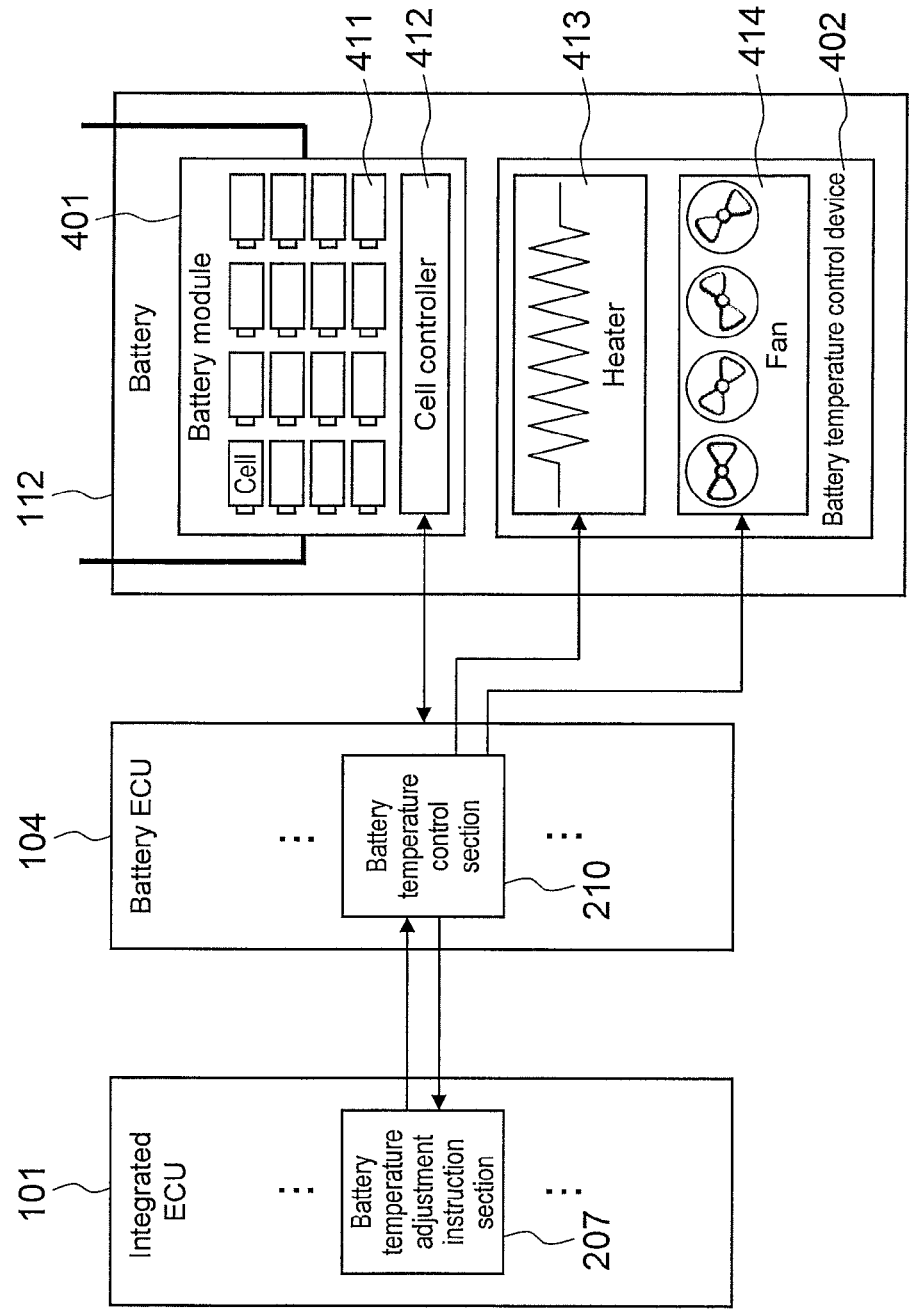
FIG. 3 is a diagram schematically showing the internal configuration of a battery shown in FIG. 1.

FIG. 3 schematically shows the internal configuration of the battery 112 shown in FIG. 1.

The battery 112 includes a battery module 401 and a battery temperature control device 402. The battery module 401 is configured to have a cascade of serially and parallelly connected battery cells 411 so as to be able to obtain desired voltage and battery capacity, and the state of each battery cell 411 is managed by an attached cell controller 412. Additionally, information about the state and the like of each battery cell 411 of the cell controller 412 is transmitted to the battery ECU 104 via a communication line.

Here, as described above, the lithium ion battery is highly dependent on temperature, and the temperature of the battery has to be managed to achieve desired battery performance. Thus, the battery 112 includes the battery temperature control device 402 within its package, and this battery temperature control device 402 includes a heater 413 for warming the battery and a fan 414 for cooling the battery. These heater 413 and fan 414 are driven according to driving instructions transmitted from a battery temperature control section 210 of the battery ECU 104, and control the battery temperature to converge to a predetermined temperature range by warming or cooling the battery.

Figure 4:
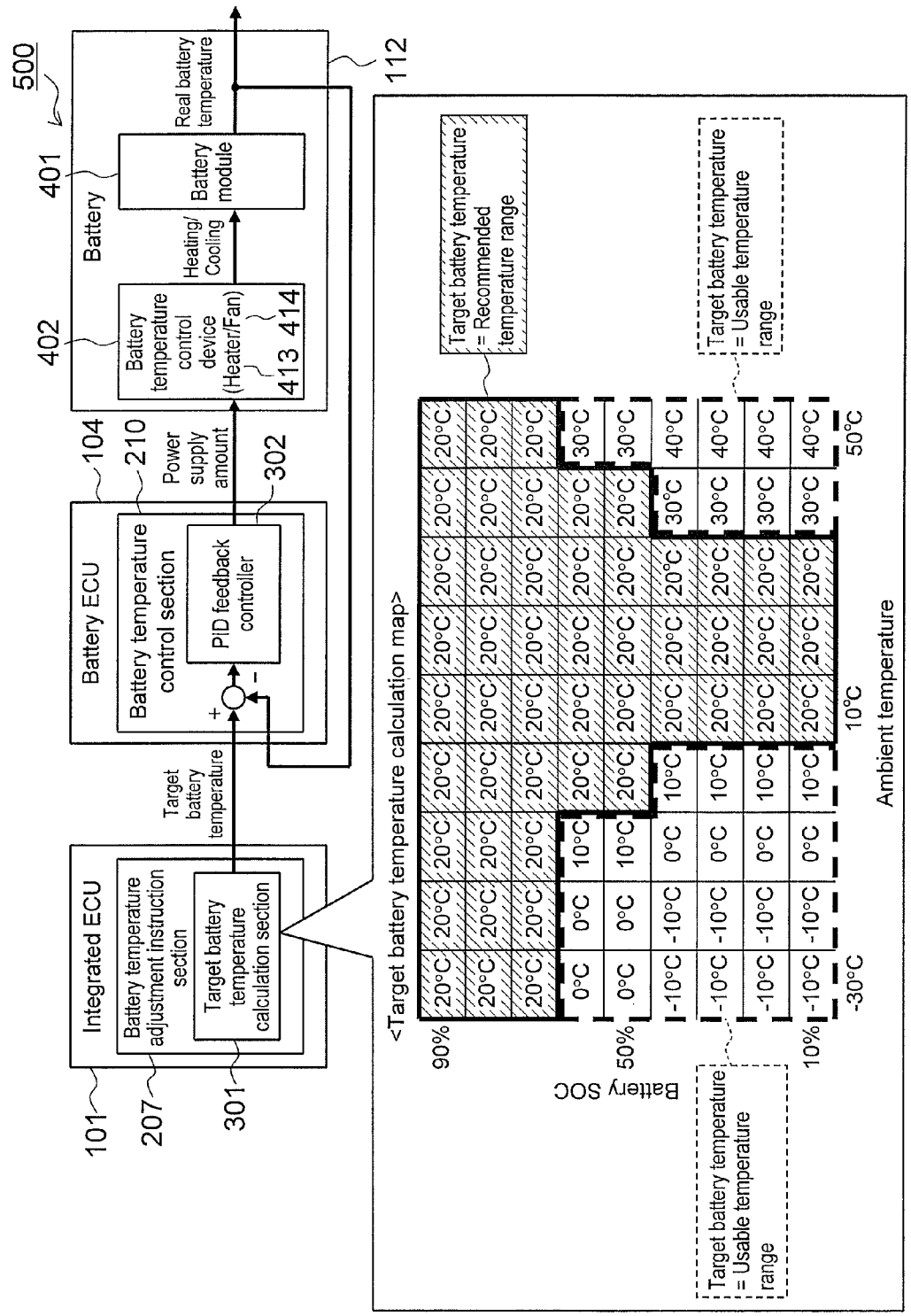
FIG. 4 is a block diagram schematically showing the first embodiment of the battery temperature control device.

FIG. 4 schematically shows the first embodiment of the battery temperature control device according to the present invention.

A battery temperature control device 500 that is shown is configured mainly from a battery temperature adjustment instruction section 207 of the integrated ECU 101, the battery temperature control section 210 of the battery ECU 104, and the battery temperature control device 402 and the battery module 401 of the battery 112, and controls the battery temperature by adopting PID feedback control.

Specifically, as described above, the integrated ECU 101 includes the battery temperature adjustment instruction section 207, and the battery temperature adjustment instruction section 207 includes a target battery temperature calculation section 301 that calculates a target battery temperature by taking into account, in a comprehensive manner, the intention of a driver (for example, an SW operation by a driver or the like) and the state of the vehicle (for example, the in-vehicle temperature, the remaining battery power, the battery life, and the like). Additionally, the calculation result for the target battery temperature calculated by the target battery temperature calculation section 301 is transmitted to the battery ECU 104 via a communication line.

The battery ECU 104 includes the battery temperature control section 210 having a PID feedback controller 302. This battery temperature control section 210 calculates the amount of power supply to the battery temperature control device 402 (for example, the heater 413 or the fan 414) that is necessary to control the battery temperature, based on a difference between the target battery temperature transmitted from the integrated ECU 101 and the actual battery temperature (the real battery temperature) transmitted from the battery 112, and transmits the calculation result of the amount of power supply to the battery temperature control device 402.

The battery temperature control device 402 of the battery 112 drives the heater 413 or the fan 414 based on the amount of power supply transmitted from the battery temperature control section 210, and performs adjustment of the battery temperature by warming or cooling the battery module 401. Also, the real battery temperature after control is fed back to the battery temperature control section 210 via a communication line.

Here, as described above, the battery temperature has to be controlled to be within the usable temperature range (for example, −10° C. to 40° C.), and from the standpoint of the battery life and the like, it is further desirable to be controlled to be within the recommended temperature range (for example, 10° C. to 30° C.). However, in the case that the environment the battery is placed in is extremely cold (at a temperature below −20° C.) or extremely hot (at a temperature above 40° C.), the energy necessary to control the battery temperature will be very high, thus possibly drastically reducing the range of the electric vehicle. Therefore, it is desirable that the target battery temperature described above calculated by the target battery temperature calculation section 301 is flexibly set taking into account the balance between the battery performance or the battery life and the range of the electric vehicle.

Thus, as shown in FIG. 4, with the battery temperature control device 500 of the first embodiment, at the time of calculating the target battery temperature at the target battery temperature calculation section 301, a target battery temperature calculation map having the amount of remaining battery power (SOC) and the ambient temperature as parameters is used.

Specifically, in the case that the ambient temperature is around the ordinary temperature (for example, 10° C. to 30°

C.), that is, in the case that power consumption necessary for controlling the battery temperature is low even if the battery temperature is controlled with the recommended temperature range (for example, 10° C. to 30° C.) of the battery as the target battery temperature, or in the case that the battery SOC is high (for example, 70% to 100%), that is, in the case that the possibility of the battery running out during the travelling of the vehicle is low even if the power consumption necessary for controlling the battery temperature is increased, the target battery temperature is set at a recommended temperature range median value (for example, 20° C.).

Also, in the case that the ambient temperature is low (for example, below 10° C.) or high (for example, over 30° C.), that is, in the case that the power consumption necessary for controlling the battery temperature is relatively high, and the battery SOC is low (for example, below 70%), that is, in the case that the battery is highly likely to run out, the target battery temperature is set at a temperature near the ambient temperature within the usable temperature range.

By setting the target battery temperature in this manner and using the result to control the battery temperature, while the battery can be prevented from deteriorating by basically setting the target battery temperature at near the median value (for example, 20° C.) of the recommended temperature range, in the case that the power consumption necessary for controlling the battery temperature is assumed to greatly affect the range of the vehicle, the target battery temperature is extended to the usable temperature range to minimize the battery temperature control, the power consumption of the battery is suppressed, and the range of the vehicle can thereby be maintained.

Additionally, to increase the degree of freedom regarding setting of the target battery temperature, a plurality of target battery temperature calculation maps may be prepared in advance in the target battery temperature calculation section 301, and the target temperature calculation maps may be used while being switched among them according to various situations.

Figure 5A:
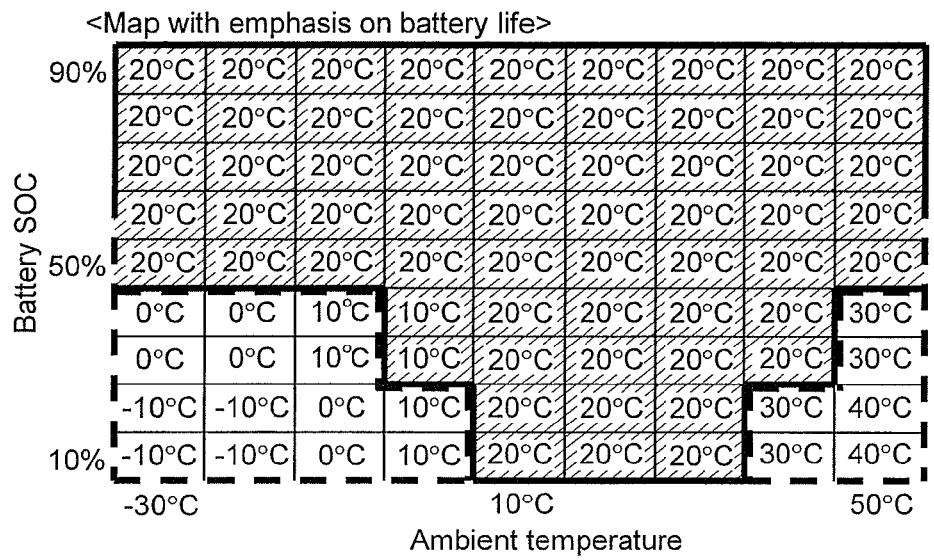
FIGS. 5A to 5C are diagrams showing examples of a target battery temperature calculation map of a target battery temperature calculation section shown in FIG. 4, and are diagrams showing an example of a map with emphasis on battery life, an example of a default map, and an example of a map with emphasis on range, respectively.
Figure 5B:
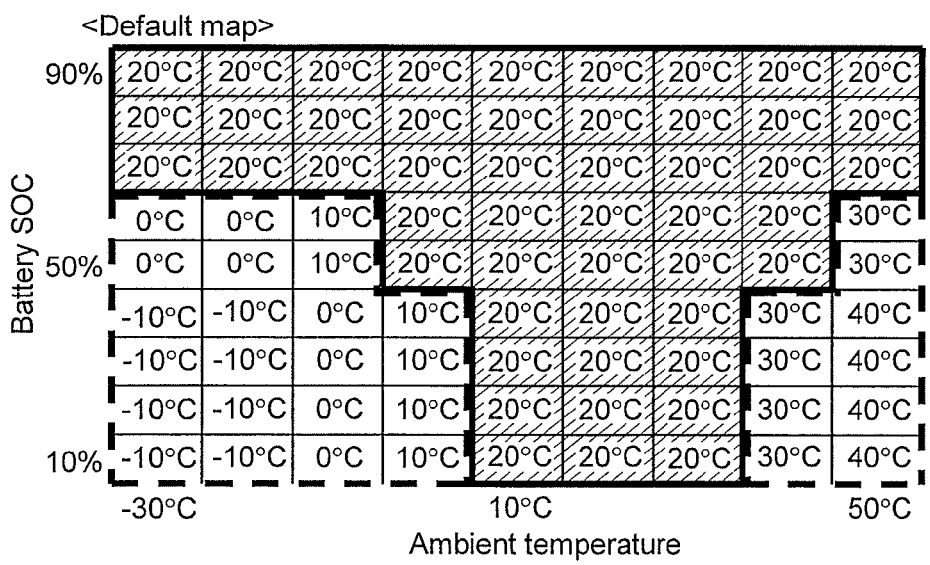
Figure 5C:
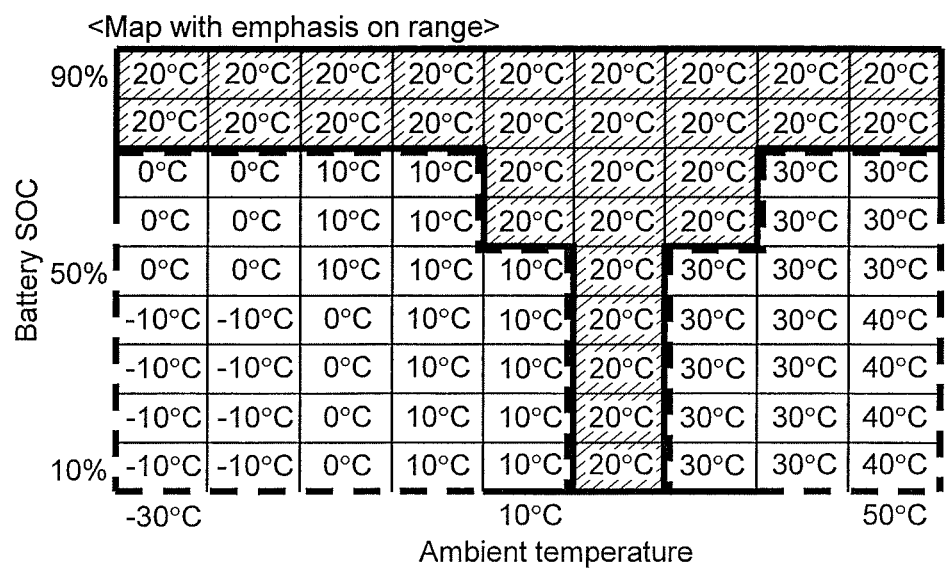

FIGS. 5A to 5C show examples of the target battery temperature calculation map held by the target battery temperature calculation section 301 shown in FIG. 4, and respectively show an example of a map with emphasis on battery life, an example of a default map, and an example of a map with emphasis on range.

When taking the default map shown in FIG. 5B as the standard, the map with emphasis on battery life shown in FIG. 5A is increased, across the entire map, in its area where the target battery temperature is equal to the recommended temperature range median value (for example, 20° C.), and is suitable in a case the driver places priority on the battery life rather than on the range of the vehicle, or travelling is mostly a short distance, for example. On the other hand, the map with emphasis on range shown in FIG. 5C is decreased in its area where the target battery temperature is equal to the recommended temperature range median value and increased in its area where the target battery temperature is equal to the temperature near the ambient temperature within the usable temperature range, and is suitable in a case the driver places priority on the range of the vehicle rather than on the battery life, or travelling is mostly a long distance, for example.

Figure 6:
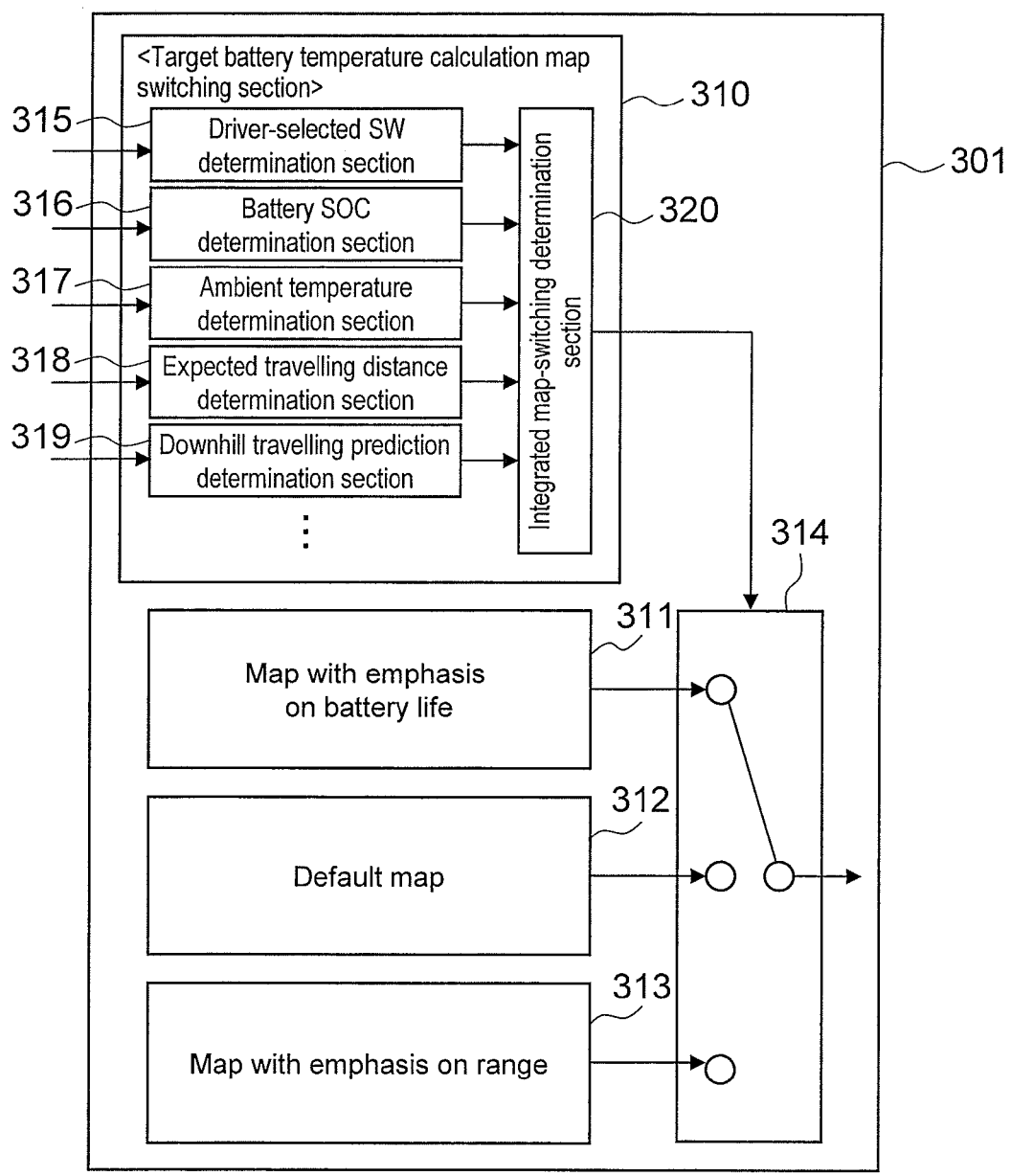
FIG. 6 is a diagram showing the internal configuration of the target battery temperature calculation section shown in FIG. 4, the diagram describing switching between the target battery temperature calculation maps shown in FIG. 5.

FIG. 6 specifically shows the internal configuration of the target battery temperature calculation section 301 shown in FIG. 4. Switching between the target battery temperature calculation maps shown in FIGS. 5A to 5C at the target battery temperature calculation section 301 will be described with reference to FIG. 6.

The target battery temperature calculation section 301 for calculating the target battery temperature includes a target battery temperature calculation map switching section 310 for determining an optimal target battery temperature calculation map based on various determination elements, and a switch 314 for switching the target battery temperature calculation map to be selected from a map with emphasis on battery life 311, a default map 312 and a map with emphasis on range 313 stored in the target battery temperature calculation section 301, based on a determination result of the target battery temperature calculation map switching section 310. Additionally, the target battery temperature calculation map selected by the switch 314 is used for calculating the target battery temperature.

Furthermore, the target battery temperature calculation map switching section 310 includes a driver-selected SW determination section 315, a battery SOC determination section 316, an ambient temperature determination section 317, an expected travelling distance determination section 318, a downhill travelling prediction determination section 319 and the like for determining respective elements, and an integrated map-switching determination section 320 for comprehensively determining the determination results of these determination sections.

Accordingly, the determination sections, such as the driver-selected SW determination section 315, the battery SOC determination section 316, the ambient temperature determination section 317, the expected travelling distance determination section 318, the downhill travelling prediction determination section 319 and the like determine various determination elements such as the SW selected by the driver, battery deterioration, the ambient temperature, the expected travelling distance, prediction of downhill travelling in the vehicle travelling route and the like, and output the determination results to the integrated map-switching determination section 320. The integrated map-switching determination section 320 determines the optimal target battery temperature calculation map, taking into account, in a comprehensive manner, the determination results output from the determination sections 315 to 319, and transmits the determination result to the switch 314.

Here, examples of the case of selecting the map with emphasis on battery life 311 by the integrated map-switching determination section 320 include cases where an SW with emphasis on battery life is selected by the driver, where the battery is deteriorated, where the expected travelling distance is short, where downhill travelling over a long period of time is predicted and battery power regeneration is expected, and the like, for example.

Also, examples of the case of selecting the map with emphasis on range 313 by the integrated map-switching determination section 320 include cases where an SW with emphasis on range is selected by the driver, where the battery is as good as new, where the expected travelling distance is long, and the like, for example.

Furthermore, examples of the case of selecting the default map 312 by the integrated map-switching determination section 320 include cases where the SW is in the default state, and where the battery is deteriorated, and a case of various vehicle states other than those described above, for example.

[Second Embodiment]

Figure 7:
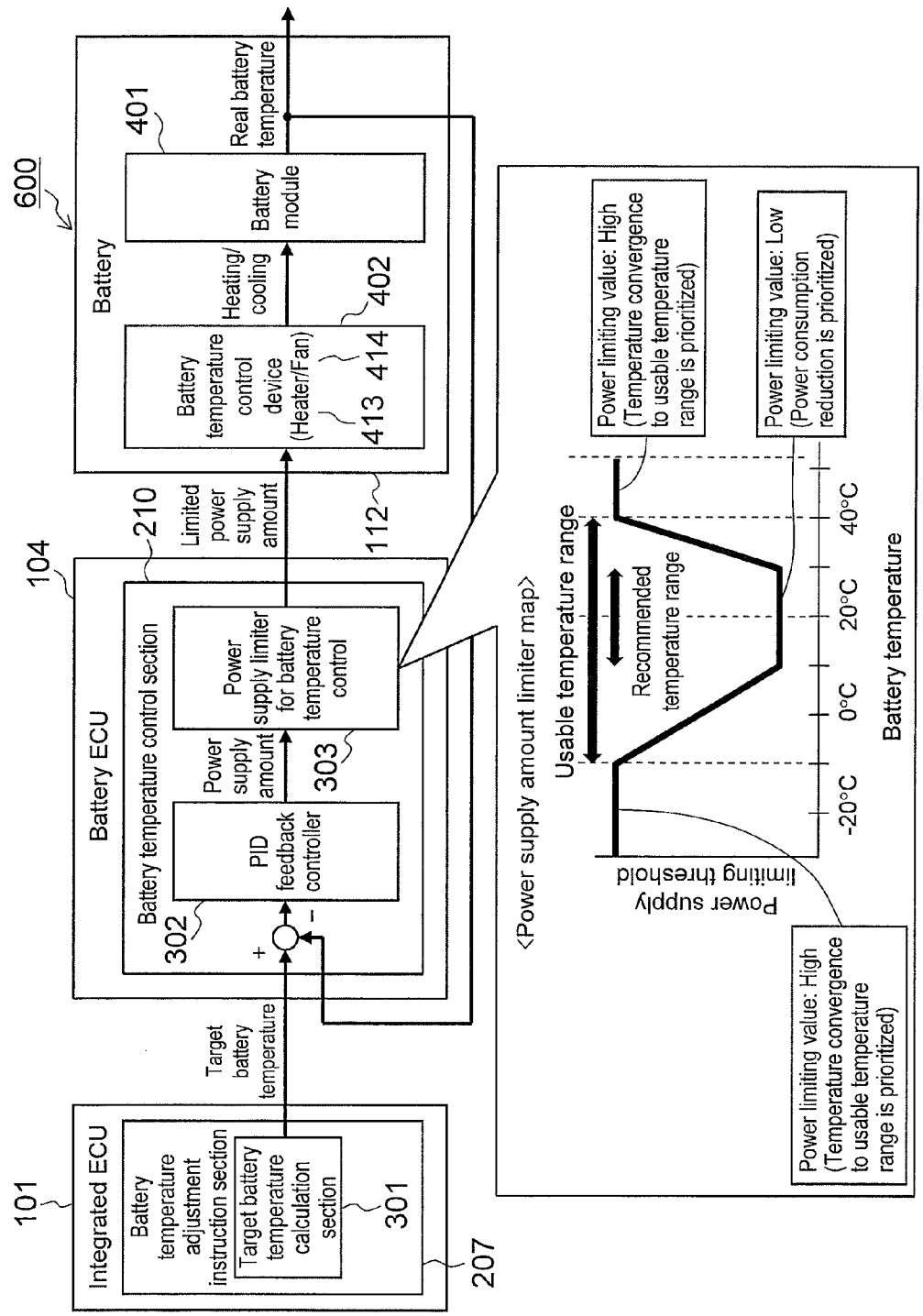
FIG. 7 is a block diagram schematically showing a second embodiment of the battery temperature control device.

FIG. 7 schematically shows a second embodiment of the battery temperature control device. Additionally, a battery temperature control device 600 of the second embodiment differs from the battery temperature control device 500 of the first embodiment in that the target battery temperature calculation section 301 is simplified by fixing the target battery temperature of the target battery temperature calculation section 301 to the recommended temperature range median value (for example, 20° C.), and in that a power supply limiter for battery temperature control 303 is provided after the PID feedback controller 302 of the battery temperature control section 210, and other structural elements are the same of those of the battery temperature control device 500 of the first embodiment. Accordingly, the structural elements same as those of the battery temperature control device 500 of the first embodiment are denoted with the same symbols and detailed description thereof is omitted.

The battery temperature control device 600 shown is configured mainly from the battery temperature adjustment instruction section 207 of the integrated ECU 101, the battery temperature control section 210 of the battery ECU 104, and the battery temperature control device 402 and the battery module 401 of the battery 112, and is for performing battery temperature control by adopting the PID feedback control, but the target battery temperature calculation section 301 of the battery temperature adjustment instruction section 207 transmits the recommended temperature range median value (for example, 20° C.) to the battery ECU 104 as the target battery temperature. Also, the battery temperature control section 210 of the battery ECU 104 includes the power supply limiter for battery temperature control 303 after the PID feedback controller 302.

The power supply limiter for battery temperature control 303 is for limiting, at the time of performing feedback control of battery temperature, the amount of power supply to the battery temperature control device 402 (for example, the heater 413 or the fan 414) corresponding to the operation amount of feedback control from the battery module 401 to within a limiting threshold (an upper limit value), based on a power supply amount limiter map having the battery temperature and the power supply limiting threshold as the parameters.

The limiting threshold of the power supply amount limiter map is, as shown in the drawing, set at a value that is in accordance with the battery temperature, or more specifically, a value that is in accordance with the difference between the target battery temperature and the real battery temperature, and is set differently particularly for the outside of the usable temperature range, between the recommended temperature range and the usable temperature range, and in the recommended temperature range. The limiting threshold is set to increase as the absolute value of the difference between the target battery temperature and the real battery temperature becomes greater, and specifically, in the case that the battery temperature is outside the usable temperature range, the limiting threshold is set to be high so as to facilitate battery temperature convergence to the usable temperature range, and interference with the feedback control is prevented. On the other hand, in the case that the battery temperature is within the recommended temperature range, the limiting threshold is set to be low so as to suppress the power consumption necessary for controlling the battery temperature, and the feedback control is interfered with and the convergence temperature of the battery temperature is allowed to change.

In this manner, the battery temperature control section 210 of the battery ECU 104 calculates the amount of power supply to the battery temperature control device 402 (for example, the heater 413 or the fan 414) necessary for battery temperature control based on the difference between the target battery temperature (for example, fixed at 20° C.) transmitted from the integrated ECU 101 and the real battery temperature transmitted from the battery 112, and also, the power supply limiter for battery temperature control 303 limits the amount of power supply based on the calculation result of the amount of power supply output from the PID feedback controller 302 and the limiting threshold that is in accordance with the battery temperature, and transmits the result regarding the limited amount of power supply to the battery temperature control device 402. Additionally, in the case that the calculation result of the amount of power supply output from the PID feedback controller 302 is below the limiting threshold, the calculation result is transmitted to the battery temperature control device 402 without the amount of power supply being limited.

The battery temperature control device 402 of the battery 112 drives the heater 413 or the fan 414 based on the amount of power supply transmitted from the battery temperature control section 210, and adjusts the battery temperature by warming or cooling the battery module 401. Also, the real temperature of the battery after control is fed back to the battery temperature control section 210 via a communication line.

Figure 8A:
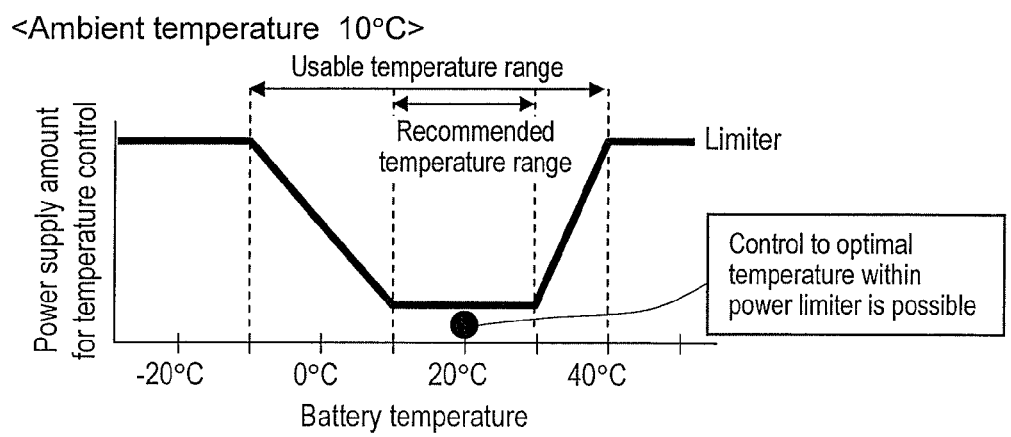
FIGS. 8A to 8C are diagrams showing the relationship between a battery temperature and the amount of power supply for battery temperature control at the time of battery temperature control by the second embodiment of the battery temperature control device in different ambient temperatures, and are diagrams showing the relationship between the battery temperature and the amount of power supply for battery temperature control where the ambient temperatures are 10° C., –10° C. and –20° C., respectively.
Figure 8B:
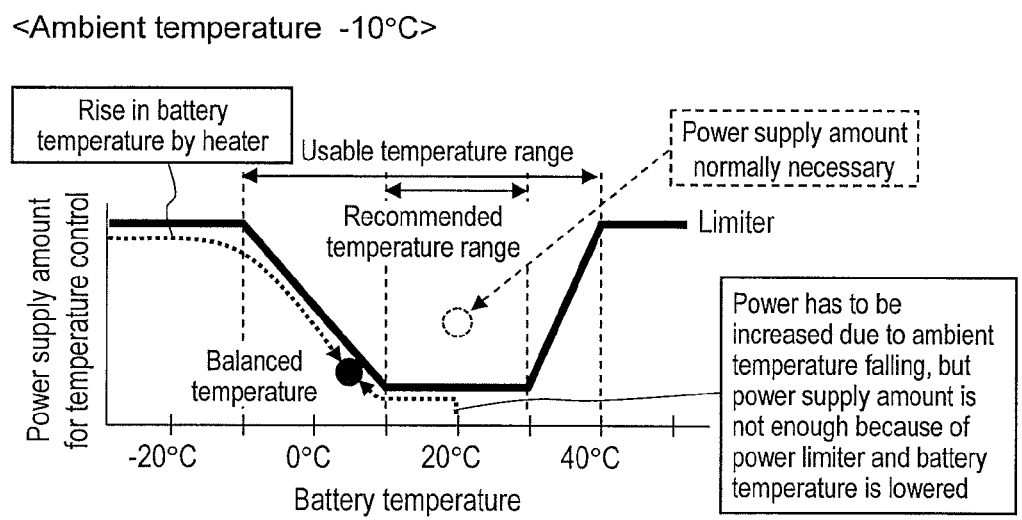
Figure 8C:
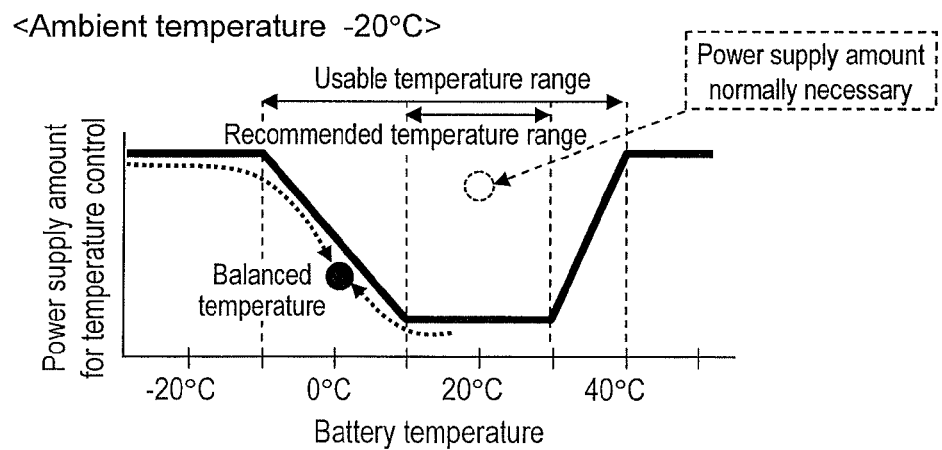

FIGS. 8A to 8C specifically show the relationship between the battery temperature and the amount of power supply for battery temperature control at the time of battery temperature control by the second embodiment of the battery temperature control device in different ambient temperatures, and show the relationship between the battery temperature and the amount of power supply for battery temperature control where the ambient temperatures are 10° C., −10° C. and −20° C., respectively.

Figure 10:
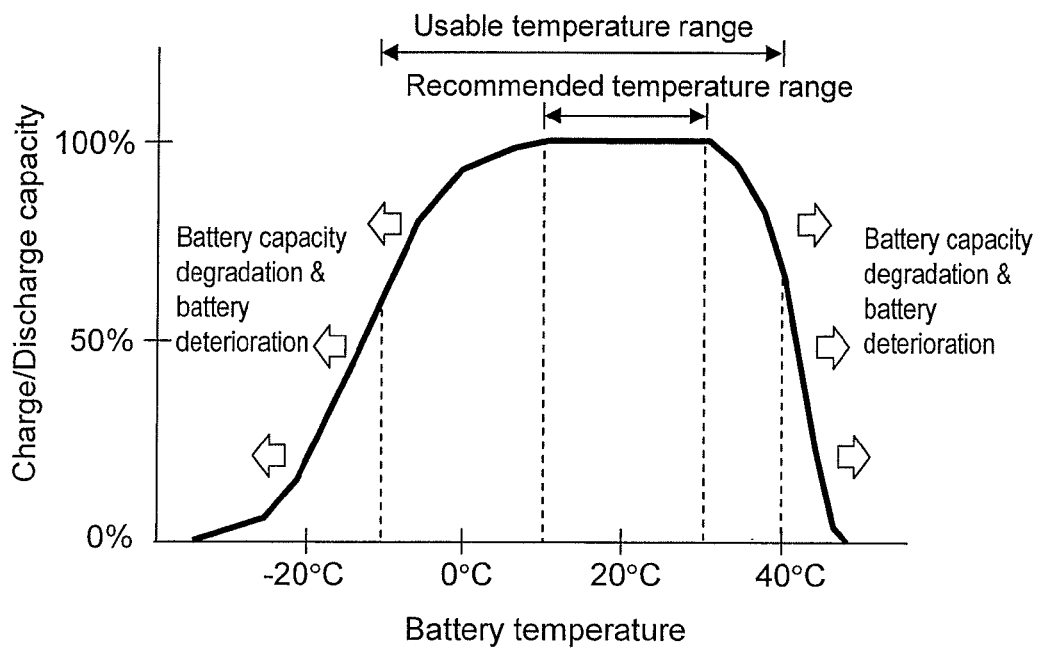
FIG. 10 is a diagram showing a temperature property of a lithium ion battery.
Figure 11A:
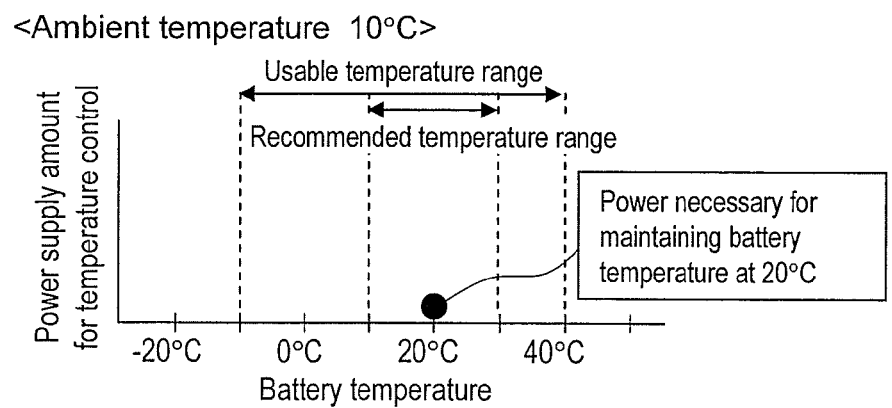
FIGS. 11A to 11C are diagrams showing the relationship between the battery temperature and the amount of power supply for battery temperature control at the time of battery temperature control by a conventional battery temperature control device in different ambient temperatures, and are diagrams showing the relationship between the battery temperature and the amount of power supply for battery temperature control where the ambient temperatures are 10° C., –10° C. and –20° C., respectively.
Figure 11B:
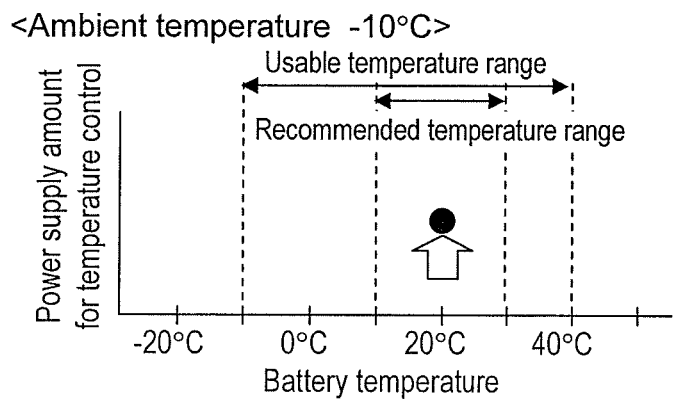
Figure 11C:
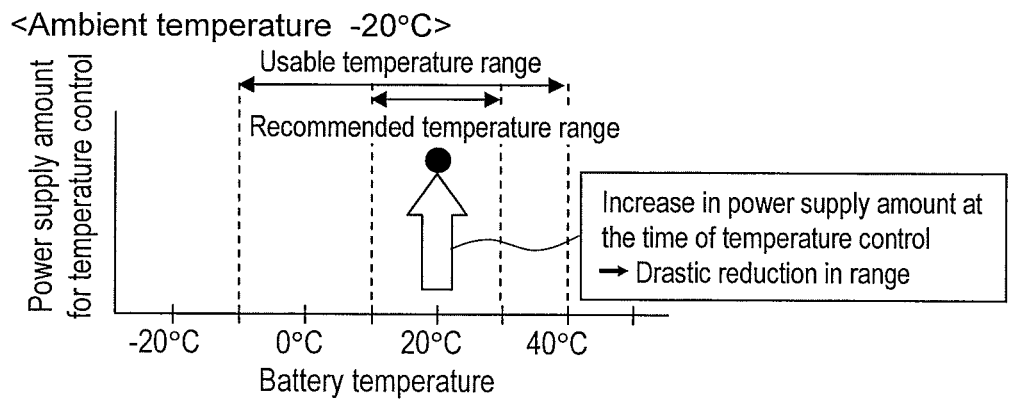

As described based on FIGS. 10 and 11, the amount of heat emitted from the battery 112 is increased as the ambient temperature falls from near the ordinary temperature to a low temperature, and the amount of power (energy) necessary for controlling the battery temperature increases. That is, as the change takes place from the environment shown in FIG. 8A (the ambient temperature is 10° C.) to the environment shown in FIG. 8C (the ambient temperature is −20° C.), the amount of heat emitted from the battery 112 is increased.

Also with the battery temperature control device 600 of the second embodiment, in the case that the ambient temperature is within a predetermined range as shown in FIG. 8A, the battery temperature can be controlled to be within the recommended temperature range by supplying the amount of power within the limiter threshold to the battery temperature control device 402.

However, with the battery temperature control device 600, since the amount of power supply to the battery temperature control device 402 particularly at near the recommended temperature range (for example, 10 to 30° C.) is limited, if the ambient temperature falls below a predetermined ambient temperature as shown in FIGS. 8B and 8C, the amount of power supply normally necessary for controlling the battery temperature cannot be supplied to the battery temperature control device 402. Accordingly, even if the battery temperature is initially about 20° C., the battery temperature falls as the ambient temperature falls to a cold temperature, making it impossible to maintain the battery temperature at around the target battery temperature (for example, 20° C.), and the battery temperature will further fall below the recommended temperature range.

On the other hand, with the battery temperature control device 600, the limiting threshold of the amount of power supply to the battery temperature control device 402 is set to increase as the battery temperature falls to below the recommended temperature range. That is, the limit on the amount of power supply to the battery temperature control device 402 is eased, and the amount of heat generated at the heater 413 is increased.

Thus, even in the environment shown in FIG. 8B (the ambient temperature is −10° C.) or in the environment shown in FIG. 8C (the ambient temperature is −20° C.), a battery temperature with a good balance of the amount of heat discharge from the battery 112 and the amount of heat supply by the heater 413 to the battery 112 (the balanced temperature) is within the usable temperature range, and the battery temperature can be controlled within the usable temperature range. Additionally, in the case that the ambient temperature changes from the environment shown in FIG. 8B to the environment shown in FIG. 8C, the amount of heat emitted from the battery 112 is increased, and the balanced temperature thereby falls from around 5° C. to around 0° C. according to the fall in the ambient temperature.

Additionally, by setting the power supply limiting threshold of outside the usable temperature range to be relatively high as shown in the drawings, the balanced temperature can be made to converge to within the usable temperature range of the battery even in the case that the battery temperature shifts to below the usable temperature range according to the fall in the ambient temperature.

By performing battery temperature control in the manner described above, while the battery temperature control is performed basically taking into account the battery life and setting a predetermined temperature in the recommended temperature range for the battery as the target battery temperature, if the power necessary to control the battery temperature so as to cause the battery temperature to converge to the target battery temperature drastically increases, the power consumption necessary for controlling the battery temperature can be effectively reduced by using a power supply amount limiter, extending the control temperature range for the battery temperature to the battery usable temperature range and performing the battery temperature control.

Furthermore, also in the second embodiment, as in the first embodiment, a plurality of power supply amount limiter maps can be prepared in advance in the power supply limiter for battery temperature control 303, and the power supply amount limiter maps can be used while being switched among them according to various situations such as a user's intention, the state of the vehicle, and the like, to thereby increase the degree of freedom regarding setting by a user and the like.

Figure 9A:
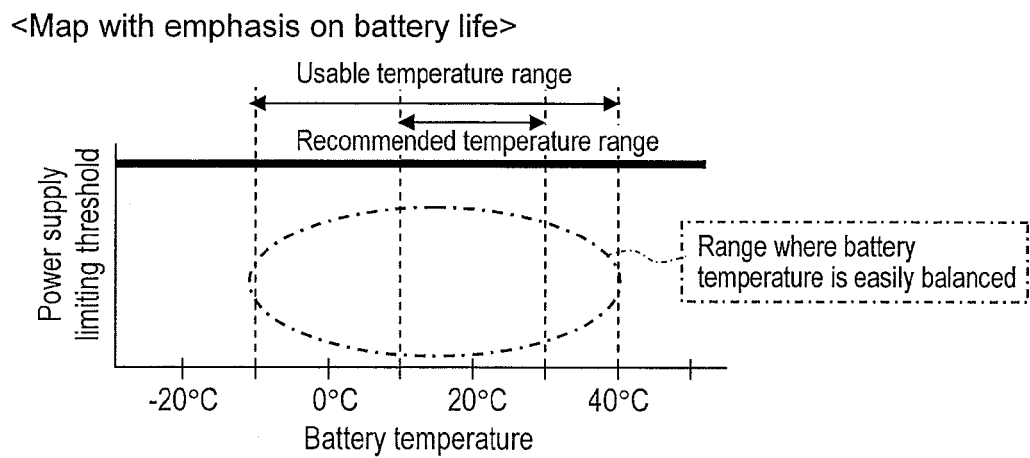
FIGS. 9A to 9C are diagrams showing examples of a power supply amount limiter map for battery temperature control held in a power supply limiter for battery temperature control shown in FIG. 7, and are diagrams showing an example of a map with emphasis on battery life, an example of a default map, and an example of a map with emphasis on range, respectively.
Figure 9B:
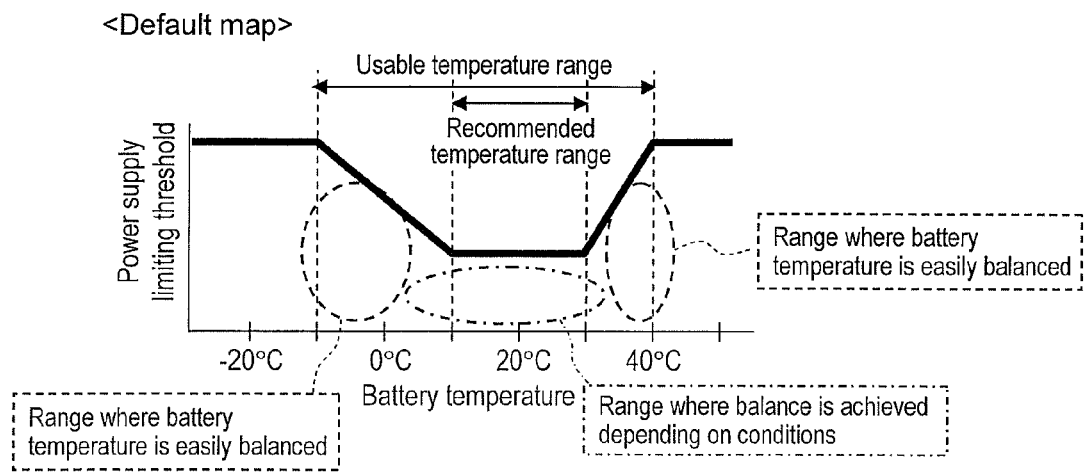
Figure 9C:
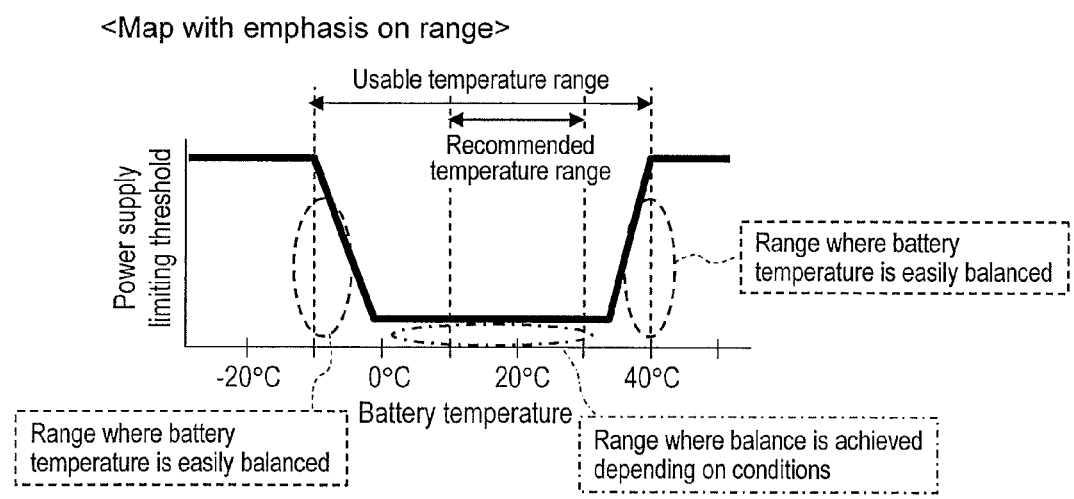

FIGS. 9A to 9C show examples of the power supply amount limiter map for battery temperature control held in the power supply limiter for battery temperature control 303 shown in FIG. 7, and show an example of a map with emphasis on battery life, an example of a default map, and an example of a map with emphasis on range, respectively.

When taking the default map shown in FIG. 9B as the standard, the map with emphasis on battery life shown in FIG. 9A sets the power supply limiting threshold relatively high across the entire range of the battery temperature, and the battery temperature can be constantly controlled to be at the median value of the recommended temperature range (for example, 20° C.) regardless of the ambient temperature or the like, for example. Also, the map with emphasis on range shown in FIG. 9C sets the power supply limiting threshold relatively low across the entire range of the usable temperature range, except for the outside of the usable temperature range of the battery, and the power consumption necessary for controlling the battery temperature can be suppressed under a wide range of conditions while maintaining control such that the battery temperature is within the usable temperature range.

By appropriately changing the power supply amount limiter map from that shown in FIG. 9A to that shown in FIG. 9C and using the power supply amount limiter map in the manner described above, the battery life and the range of the electric vehicle can both be maintained at a high level.

As described above, according to the battery temperature control devices according to the present embodiments, the target battery temperature used to control the battery temperature is basically set at the median value of the recommended temperature range and battery deterioration is prevented, but if the power consumption necessary for controlling the battery temperature is assumed to greatly affect the range, the control of the battery temperature is kept at minimum and the power consumption necessary for controlling the battery temperature is suppressed, and the range of the vehicle can thereby be maintained.

Additionally, the present invention is not restricted to the embodiments described above, and includes various modifications. For example, the embodiments described above are described in detail to enable easy understanding of the present invention, and are not necessarily restricted to those that include all the structural elements described. Also, a part of the structural elements of an embodiment can be replaced by a structural element of another embodiment, or a structural element of an embodiment can be added to a structural element of another embodiment. Furthermore, other structural elements can be added to, deleted from, or replace a part of the structural elements of each embodiment.

Also, each structural element, function, processing section, processing means and the like described above may be partly or wholly realized by hardware by being implemented in an integrated circuit, for example. Also, each structural element, function and the like may be realized by software by a processor interpreting, and executing, a program for realizing each function. Information about a program for realizing each function, a table, a file and the like may be stored in a storage device such as a memory, a hard disk, or an SSD (Solid State Drive), or in a recording medium such as an IC card, an SD card, or a DVD.

Furthermore, a control line or an information line is shown only when it is necessary for the sake of explanation, and each of control lines and information lines in the product is not necessarily shown. In reality, it can be said that almost all the structural elements are interconnected.

DESCRIPTION OF SYMBOLS

100 Electric vehicle
101 Integrated ECU
102 Brake ECU
103 Motor ECU
104 Battery ECU
105 Air conditioner ECU
106, 115 Brake disc
107 Inverter
108 Motor
109 Reduction gear
110 Axle (Drive shaft)
111 Drive wheel (Front wheel)
112 Battery
113 Air conditioner
114 Rear wheel
201 Integrated control section
202 Vehicle motion control section

203 Energy management section
204 Failure handling section
205 Target brake braking force calculation section
206 Target motor braking/driving force calculation section
207 Battery temperature adjustment instruction section
208 In-vehicle temperature adjustment instruction section
210 Battery temperature control section
301 Target battery temperature calculation section
302 PID feedback controller
303 Power supply limiter for battery temperature control
310 Target battery temperature calculation map switching section
311 Map with emphasis on battery life
312 Default map
313 Map with emphasis on range
314 Switch
320 Integrated map-switching determination section
401 Battery module
402 Battery temperature control device
411 Battery cell
412 Cell controller
413 Battery heater
414 Battery fan
500, 600 Battery temperature control device

What is claimed is:

1. A battery temperature control device for controlling a battery temperature such that the battery temperature converges to a predetermined temperature range, comprising:
   a battery module having a plurality of connected battery cells and a cell controller,
   a battery temperature adjustment device including a warming device for warming the battery module and a cooling device for cooling the battery module,
   an integrated ECU to which various signals associated with vehicle operation are input and in which a recommended temperature range, suitable for battery use, and a usable temperature range, in which a battery is usable are stored, the usable temperature range being wider than the recommended temperature range, and
   a battery ECU, receiving input from the integrated ECU, by which the predetermined temperature range is set to the recommended temperature range or the usable temperature range, according to at least one of an outside environment, a state of a vehicle, and an intention of a driver, based on input from the integrated ECU.

2. The battery temperature control device according to claim 1, wherein the battery ECU includes a power supply limiter with a limiting threshold, for limiting energy from a battery, that is used to converge the battery temperature to the predetermined temperature range, and wherein the power supply limiter sets the limiting threshold according to at least one of the outside environment, the state of a vehicle, and the intention of a driver.

3. The battery temperature control device according to claim 2, wherein the limiting threshold is set based on a difference between a target battery temperature within the predetermined temperature range and a real battery temperature.

4. The battery temperature control device according to claim 3, wherein the limiting threshold becomes greater as an absolute value of the difference becomes greater.

5. The battery temperature control device according to claim 2, wherein the limiting threshold is set based further on an expected vehicle travelling distance and/or a vehicle travelling route.

6. The battery temperature control device according to claim 2, wherein the energy includes remaining energy of the battery and/or energy regenerated to the battery.

* * * * *